Aug. 13, 1963  R. J. BONDLEY  3,100,339
METHOD OF MAKING COMPOSITE BODIES
Filed June 11, 1958  3 Sheets-Sheet 1

Inventor:
Ralph J. Bondley;
by Richard R. Brainard
His Attorney.

Aug. 13, 1963  R. J. BONDLEY  3,100,339
METHOD OF MAKING COMPOSITE BODIES
Filed June 11, 1958  3 Sheets-Sheet 2
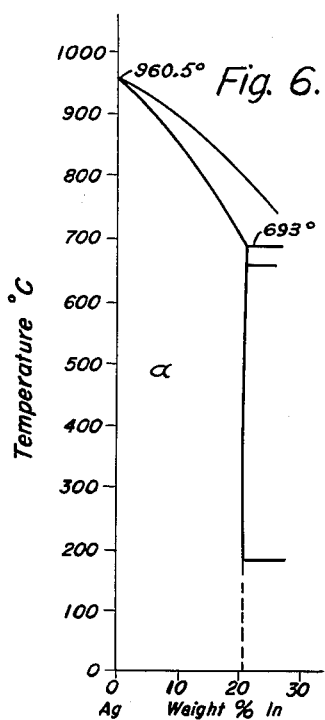
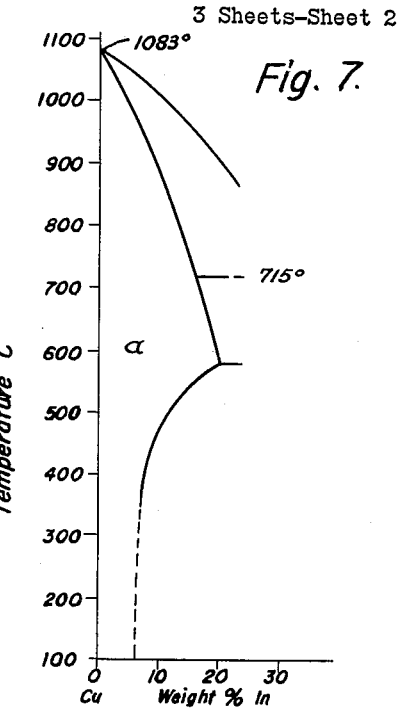
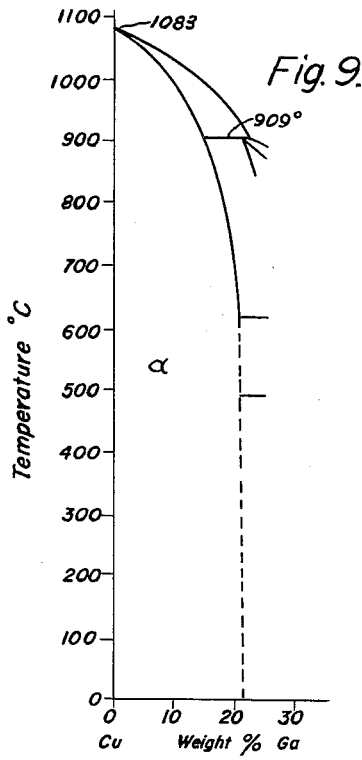
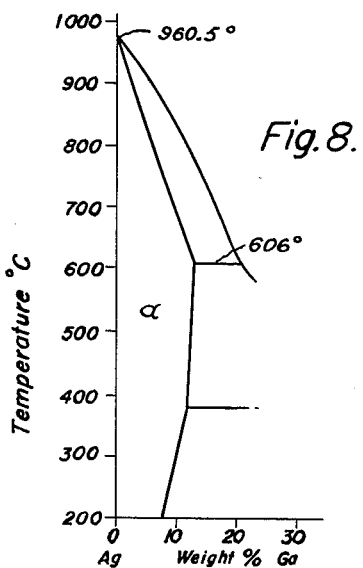
Inventor:
Ralph J. Bondley;
by
His Attorney.

Aug. 13, 1963   R. J. BONDLEY   3,100,339
METHOD OF MAKING COMPOSITE BODIES
Filed June 11, 1958   3 Sheets-Sheet 3
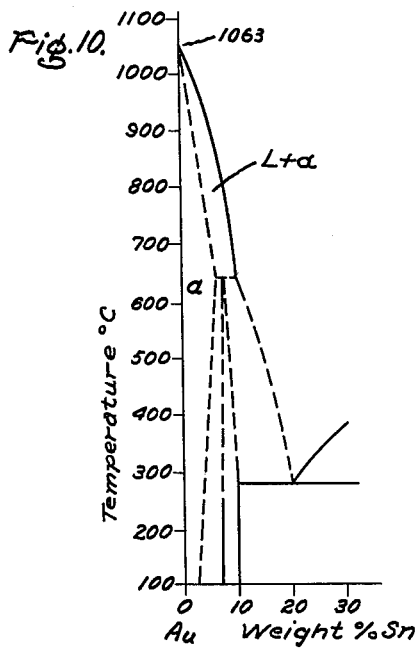
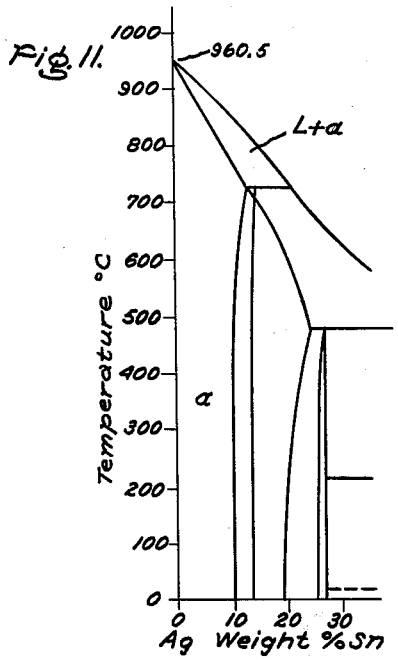
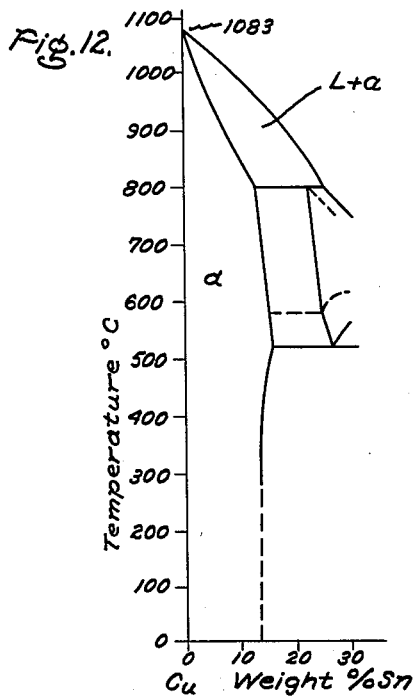
Inventor:
Ralph J. Bondley,
by Richard R. Brainard
His Attorney.

United States Patent Office 3,100,339
Patented Aug. 13, 1963

3,100,339
METHOD OF MAKING COMPOSITE BODIES
Ralph J. Bondley, Scotia, N.Y., assignor to General
Electric Company, a corporation of New York
Filed June 11, 1958, Ser. No. 741,713
6 Claims. (Cl. 29—473.1)

The present invention relates to an improved method of making composite bodies by bonding nonmetallic refractory bodies together or to a metal structural member and particularly to such a method which produces a bond possessing considerable strength and capable of withstanding high operating temperatures. The method of the present invention is especially suitable for bonding quartz to a structural member of a metal such as silver. The present application is a continuation-in-part of my application Serial No. 607,189, filed August 30, 1956, now abandoned. Claims directed to improved composite bodies of the type produced by the method claimed in this application are presented in my divisional application Serial No. 210,279, filed June 15, 1962, and assigned to the assignee of the present invention.

In the electrical art, it is frequently desirable to hermetically bond nonmetallic refractory bodies together or to a metal member to form an insulated terminal structure for an electric discharge device, a capacitor, a wave guide window, a lamp enclosure or similar device.

When a metal is rigidly bonded to a nonmetal, the strength of the resulting joint is determined (other than by the strength of the individual components) by the stress at the interface. This stress is a function of the difference in the thermal coefficient of expansion of the metal and the nonmetal body; the temperature difference between the conditions under which the device is being operated and that at which the seal was made; the modulus of elasticity of the materials; and the yield point of the structural metal.

The difference between products of the temperature coefficient and the temperature change for each component gives the size differential that would exist if the two were not rigidly joined. Since no size difference can exist, the force necessary to deform the materials to the same size is determined by the modulus of elasticity of the materials or the yield point of the structural material or both. If the resulting stress is below the breaking point of the nonmetal member, then the seal will stay together. The difference between the "built in" strain and the actual strength of the nonmetal (in other words, the strength of the joint) divided by the strength of the nonmetal might be called a figure of merit for the particular combination. The nearer this quantity approaches unity, the more nearly strain free or perfect the seal becomes. This assumes that the strength of the bond is equal to or greater than the strength of the nonmetal and is a valid assumption for a reasonably good bond.

The ideal condition cannot be attained unless the metal and nonmetal have identical thermal expansion properties. In this instance no strains exist and the strength of the seal is that of the interface complex. This ideal combination is rarely found, and for most substances is impossible to achieve. The latter appears to be the case with quartz glass (or fused quartz), the thermal coefficient of expansion of which is $0.55 \times 10^{-6}$ per degree centigrade. As used in this specification and in the claims, quartz means fused quartz or quartz glass rather than crystalline quartz. The metal tungsten is probably the closest to quartz glass in expansion with a coefficient of $4.7 \times 10^{-6}$ per degree centigrade. With this difference in expansion, and because of the great strength of tungsten, massive seals directly between quartz glass and tungsten are impractical.

Quartz is a highly desirable dielectric material for use in high frequency electric discharge devices and the like since it has a high dielectric strength, a low dielectric loss and a low dielectric constant. Unfortunately many applications for quartz in devices of this character require a large area metal-to-quartz bond which has reasonable strength, is vacuum-tight, and which may be operated at temperatures of several hundred degrees centigrade. These have been, prior to this invention, essentially an impossible combination of requirements and, accordingly, this very desirable material has found only limited use in these applications.

The mechanical properties of clear fused quartz are given as:

Compressive strength_____ 160,000 lbs. sq. in.
Tensile strength_____ 7,000 lbs. sq. in.
Melting point_____ >1,500° C.

Some of the metals, notably silver, have a proportional limit as low as 1,000 lbs. per sq. in. when fully annealed. It would appear then, that silver could be joined to fused quartz, since the quartz would deform the silver at the joint (without exceeding its ultimate strength). Because of the melting point of silver (960° C.) compared to very high softening temperature of quartz, seals cannot be made with the conventional processes of melting and forming the quartz glass to the structural metal. Many attempts have been made to provide improved bonding processes for such applications which will provide a joint of good strength at elevated temperatures and which is vacuum-tight. Considerable progress has been made along this line and one such method utilizing an active metal hydride and a solder, such as copper or silver, is described and claimed in Patent No. 2,570,248—Kelley, assigned to the assignee of this application. The direct application of this process to the making of bonds between materials such as quartz and silver has not been successful. A titanium-silver or titanium-silver-silicon compound is apparently formed and results in an interface formation between the quartz and the structural member, with the result that the mechanical strength of the joint is less than the stress generated by this combination of materials. In accordance with the process described in the Kelley patent mentioned above, bonds between nonmetallic refractory members and metal members having substantially different temperature coefficients of expansion have been made by the use of low-melting-point ductile solders. Joints made in accordance with these methods, however, have retained in them a layer of ductile solder metal and have been limited to applications where the temperatures encountered are below the melting point of the solder involved. Accordingly, it is an important object of the present invention to remove this limitation with respect to temperatures encountered while at the same time providing a joint of substantial mechanical strength. This is accomplished by utilizing a ductile solder metal in combination with an active material such as titanium hydride or zirconium hydride to form a strong bond with the nonmetallic refractory body. These ductile solders, in general, melt at low temperatures. In a subsequent heating step, the layer of metallizing thus provided is alloyed with the structural member. The amount of the low-melting-point solder available is limited so that after the second heating step it does not exist by itself and is alloyed with the titanium and the structural metal. For example, if silver is the structural metal and indium is the low-melting-point solder, to operate the seal at temperatures above the melting point of the indium, it is necessary that an indium-silver alloy be formed having such a percentage of indium, specifically less than 20% by weight of the total alloy, that essentially only an alpha-phase alloy is provided. Such an alloy has a melting point above 700° and below 960° C., the melting point of pure silver, dependent upon the percentages of silver and indium present.

In its broader aspects, the invention may be considered to involve bonding of a nonmetallic refractory body to a structural member of a relatively yieldable metal by an interlayer produced by an active metal (preferably prepared in place by the dissociation in the metal hydride) and a low melting point ductile solder. The active metal is present only to the extent necessary to produce bonding to the nonmetallic refractory body so that the resultant alloy of the active metal and the low-melting-point ductile solder is not brittle. Also, the amount of the low-melting-point ductile solder available for alloying with the structural member must be limited to the extent that when alloying between the ductile solder and the structural member is accomplished during the subsequent heating step, the alloy is ductile and has a much higher melting point than the ductile solder. This occurs if only the alpha-phase alloy is present. The bond may be subjected to any temperature below the melting point of this alloy. In the case of the preferred materials which will be described more in detail at a later point in the specification, this temperature is several times the melting point of the ductile solder alone. Thus, the resultant bond can be made suitable for operation at temperatures above 500° C., for example, while retaining the mechanical characteristics which, in accordance with the prior art could only be achieved by a layer of low-melting-point solder which limited the use of the bond to low temperature applications.

Materials which may be used in accordance with the present invention may be summarized briefly in the following manner. For the nonmetallic refractory body this invention is applicable with particular advantage to quartz and similar high silica bodies since quartz has been very difficult to bond to another structural member by a joint which is mechanically strong and which, at the same time, will withstand elevated temperatures, say, in the order of several hundred degrees centigrade. The active metal may be zirconium or titanium and is preferably used in the form of a hydride since the elemental metal is difficult to maintain in a pure state and if stored easily takes up gas which tends to contaminate the bond. If the hydrides are used, titanium is preferred over zirconium for most applications. The ductile solders which may be used include indium, gallium, thallium, tin, zinc and cadmium. Tin, indium and gallium are preferred in this group particularly for vacuum envelopes since they exhibit a rather low vapor pressure as compared to the other solders mentioned. They also have good metallurgical properties for alloying with the structural members which may be of silver, gold or copper. The phase diagrams of silver and copper with indium and gallium show that alpha-phase alloys exist with a substantial percentage of the solder present. Although the alpha-phase alloys of tin-silver, tin-gold and tin-copper are quite narrow on the constitution diagrams and the amount of tin must be rigidly controlled to insure the presence in the seal of only the alpha-phase alloy of the tin and the parent metal, the tin alloy seals have good electrical conductivity and exhibit low vapor pressure. These properties are very desirable for vacuum envelope electric devices. Zinc and cadmium tend to exhibit higher vapor pressure and are less desirable for vacuum envelopes. Also, alloys of cadmium and copper tend to be hard and nonyielding. Thallium works satisfactorily only when used with silver as the structural metal.

A better understanding of my invention may be had by considering in detail examples of processes carried out in accordance with my invention and by reference to the accompanying drawing in which FIG. 1 is an elevational view, partially in section, of a composite body formed in accordance with my invention.

FIGS. 6, 7, 8, 9, 10, 11 and 12 show respectively the phase diagrams for the following alloys: indium-silver, indium-copper, gallium-silver, gallium-copper, tin-gold, tin-silver and tin-copper.

Figure 1:
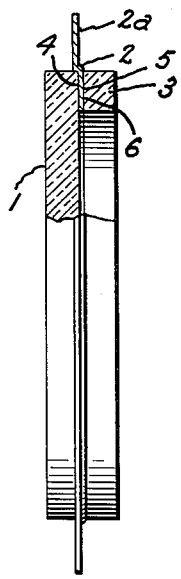

Referring now to the drawing, FIG. 1 illustrates the application of the present invention to a structure suitable for a wave guide window or the like. The window is provided by a disk of quartz 1 bonded to an annular metal disk 2 provided with a peripheral flange 2a which may be used for brazing or otherwise securing the window to a wave guide. The disk may be of silver, gold or copper but is preferably formed of silver. An annular ring, also of quartz, and having a thickness substantially equal to that of the quartz disk 1, is bonded to the opposite side of the metal disk 2. This backing ring of the same material as the window tends to equalize the forces on opposite sides of the structural member 2 and to prevent buckling of the member and resultant rupture of the bond. In preparing parts 1 and 3 for making the bonds, the surfaces 4 and 5 which are to be bonded to the flange 6 of the annular ring 2 are first painted with a thin layer of a suitable fugitive adhesive such as solution of polyvinyl alcohol, polybutane or the like. The sticky coated area is then dusted with a thin layer of finely powdered (300 mesh or finer) titanium hydride (or zirconium hydride). Any excess hydride is dusted off to leave a layer essentially 1 grain thick. Finely divided solder, in this example, indium, is then applied over the thin layer of titanium hydride and these coated members are placed in a bell jar which is evacuated. After a good vacuum is obtained, preferably in the order of .1 micron, the temperature is raised sufficiently to release the hydrogen from the hydride, react the reactive metal with the quartz, and alloy it with the indium. This temperature is not critical and may be varied over a substantial range. A temperature of 530° C. to 600° C. is adequate to dissociate the hydride at a reasonably rapid rate and effect the reaction with the quartz and indium in a matter of 3 to 5 minutes. The coating thus applied preferably should be in the order 1 to 10 mils thick and may be thicker for some combinations of materials, particularly if a thick structural member is employed. If upon inspection there appears to be an excess of solder it may be removed by scraping with a sharp tool such as a razor blade. Even when the coating is reduced to a thickness of 1 mil or less substantially pure ductile solder metal is available for the subsequent alloying with the structural member. This results from the thinness of the layer of titanium employed and the small amount of titanium employed. As indicated above, the titanium is preferably 1 particle thick and of 300 mesh or finer. It is necessary to limit the amount of indium available so that upon subsequent heating with the silver member 2 all of the indium will be alloyed with silver and only an alpha-phase alloy will remain. From an inspection of the phase diagram of FIG. 6, it will be seen that this requires less than 20% indium in the indium-silver alloy. It is therefore necessary that excess solder not be present when the subsequent heating takes place. It is preferable that the indium be limited in amount to the extent that the indium-silver alloy contains much less than 20% indium (e.g. 1–3%). The parts 1 and 3 are then assembled on opposite sides of the silver member 2 with the surfaces 4 and 5 in engagement with opposite sides of the flange 6. The parts are held assembled in this manner by spring or weight loading and again placed within a chamber which is evacuated. Upon the attainment of a good vacuum, the parts are heated to a temperature sufficient to partially alloy the structural member 2 with all of the solder metal, for example, at a temperature of about 850° C., but in any case less than the melting point of the homogeneous alloy of indium and silver. For the materials just described, the melting point would be above 700° C., but less than 960.5° C., the melting point of pure silver, the exact temperature depending upon the ratio of indium to silver present.

The time required for the second heating step varies with the mass of the parts involved and the rate of supplying heat. The actual time is that required for the metals to alloy after the whole seal has reached the desired temperature. For the structure shown in FIG. 1 and with the quartz parts 1 and 3 having a thickness of ¼", the second heating step requires about 10 minutes.

As the temperature of the part is raised, a small amount of liquid metal appears and then gradually disappears as the alloy becomes stable at a given temperature. Since the amount of indium has been suitably limited, the alloy finally solidifies at a temperature above 700° C. and as indicated above, less than 960.5° C. Of course, if the temperature is carried too high, the whole metal mass becomes liquid and runs out of the joint. However, with the information provided in the preceding description, no difficulty is encountered in determining the amount of indium and a suitable upper limit of temperature for the second heating step.

Figure 3:
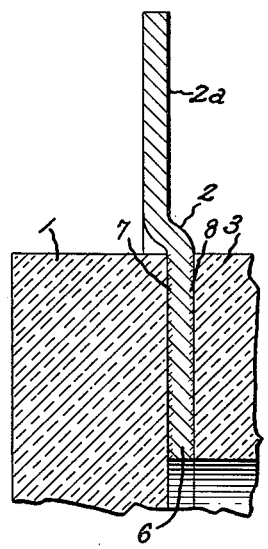
FIG. 3 is a similar view showing the parts after the bond has been made.

The joint is allowed to cool and then removed from the vacuum chamber. It appears essentially as shown in FIG. 3 with the areas of the indium-silver alloy shown at 7 and 8 as doubly cross-hatched. In the above specific example of the present invention, the process has been described as carried out in vacuum. It will be readily appreciated by those skilled in the art that the process may also be carried out in nonreactive gases such as helium, argon, xenon, krypton and the like. When the process is carried out in a gaseous atmosphere, the parts tend to heat more rapidly and the heating times are correspondingly reduced. In the appended claims the expression "nonreactive atmosphere" is used to indicate either a vacuum or an atmosphere of a gas of the type mentioned above.

The nature of the present invention and its advantages will be more readily appreciated from a study of the phase diagram of FIG. 6 for indium and silver. While indium melts at 155.4° C., the alpha-phase alloy which may be formed with percentages of indium up to 20 percent, melts at temperatures ranging from 693° C. to 960.5° C. An alloy containing 10 percent indium, for example, melts at approximately 850° C. It is apparent, therefore, that the present invention involves a recognition of the possibility of providing the combination of mechanical ductility with a relatively high melting point in the bonding of material such as quartz to a metal structural member for use in high temperature applications. The process just described may be repeated for other combinations of material previously mentioned. To illustrate these, reference may be had to the remaining phase diagrams shown in FIGS. 7, 8, 9, 10, 11 and 12.

For copper and indium, for example, the beneficial results of the present invention may be realized if the percentage of indium in the indium-copper alloy is kept below about 7 percent. With 3 percent indium, the temperature of the second heating step may be as high as 950° C. but, of course, must be substantially less than 1000° C., the melting point of the 3% indium-copper alloy.

In a similar manner, the process may be carried out with gallium-silver or gallium-copper. For example, for gallium silver the alpha-phase is insured if the gallium is kept below about 8%. With 7½% gallium, the liquid point of the alloy is about 875° C. Accordingly, the second heating step may take place at a temperature between 750° C. and 850° C. For copper-gallium the range of gallium percentage for the alpha-phase runs up to about 15%, with the melting point of the alpha-phase alloy starting at about 910° C. For percentages of gallium in the range of about 2½%, temperatures well in excess of 910° C. may be withstood. Temperatures for the second heating step of the bonding process in the range of 900° C. to 1000° C. are satisfactory with a gallium percentage in the order of 2½%.

When the materials used result in an indium-gold alloy, the alpha-phase alloy may be formed with indium less than 5%, at which percent melting point of the alloy is about 647° C. At 2% indium, the melting point of the alloy is above 900° C. With this latter percentage of indium, a suitable temperature for the second heating step is below this latter temperature of 900° C. and above the former temperature of 647° C.

When the materials used result in a gallium-gold alloy, the alpha-phase may be formed with gallium less than 25%, at which percentage the melting point of the alloy is 275° C. With 5% gallium, a suitable percentage for the purposes of this invention, the melting point of the alloy is about 950° C. Therefore, with this latter percentage the second heating step should be carried out, below 950° C. and substantially above the former temperature.

Tin is another low melting point solder which may be used in accordance with the present invention. Tin has the advantage, particularly for vacuum devices, of having a low vapor pressure at moderate operating temperatures. From the standpoint of carrying out the process, and as will be readily observed from FIGURES 10, 11, 12, the alpha phase region of the constitution diagrams for tin alloys of gold, silver and copper are rather narrow so that the percentage of tin in the alloy formed by the second heating step between the metal of the structural member, namely, silver, gold or copper and the tin must be closely controlled. As will be observed from FIGURES 10, 11 and 12 the tin-copper diagram shows an alpha phase up to 13% tin where the softening point is 798° C., tin-silver alloys possess an alpha phase with a tin content up to 11% where the softening point is 724° C. and for the tin-gold alloy the limit of tin is about 3% with a softening temperature of 950° C. In carrying out the process in accordance with the present invention it is desirable to limit the percentages of the tin available for alloying with the structural metal to amounts substantially below the values mentioned above which are the maximum values at which none of the tin appears as a pure metal but rather is present entirely as an alpha-phase alloy. For example, with the gold-tin combination an alloy containing about 2% tin is desirable and such a seal may be made at a temperature of about 975° C. for the second heating step. Similarly with silver the percentage of tin should be kept at 5% or below in which case the bond may be made at about 875° C. With the tin-copper combination a bond may be made in accordance with the present invention by maintaining the tin in such a limited quantity that the resulting alloy with the structural metal is 5% or less tin in which case the bond may be made at a temperature of about 1000° C.

The process may also be carried out for combinations of the other solders, namely thallium, cadmium and zinc, with the three structural metals, namely silver, gold, and copper. Information regarding these alloys, including the minimum temperature at which an alpha-phase alloy only may be formed for a given percentage of ductile solder is available in metallurgical textbooks, such as the book "Der Aufbau der Zweistofflegierungen" (the constitution of binary alloys) by M. Hanson, published in Berlin in 1936 by Julius Springor. Of the possible combinations of these materials, thallium does not work satisfactorily with gold and copper, due largely to the metallurgy of the alloys of these materials. One other alloy, the cadmium-copper alloy, is not very useful because the presence of a small amount of cadmium tempers copper so that one of the advantages, the yielding of the structural member, sought by the present invention, is not actually obtained with the cadmium-copper alloys.

The remaining combinations may be carried out, however, in the same general manner as described above, with the amount of solder metal being limited sufficiently so that only ductile or alpha-phase alloys result from the second heating step. In this way it is possible to produce a bond with a ductile interface which, at the same time, is capable of withstanding temperatures very much above the melting point of the ductile solder metal employed. In each case, the second heating step is carried out at a temperature below the melting point of the alloy of ductile solder and structural member, which would result if homogeneous conditions were attained and above that which is required to insure that only an alpha-phase alloy results.

In the foregoing description of the sealing process with respect to the constitution diagrams only the binary systems of the solder metal and structural member have been considered. It is appreciated that the presence of the active metal, either titanium or zirconium, will change the conditions slightly. However, the amount of the active metal is kept very small so that the considerations of the binary systems alone provide information which is sufficiently accurate to give workable conditions for the process.

Figure 2:
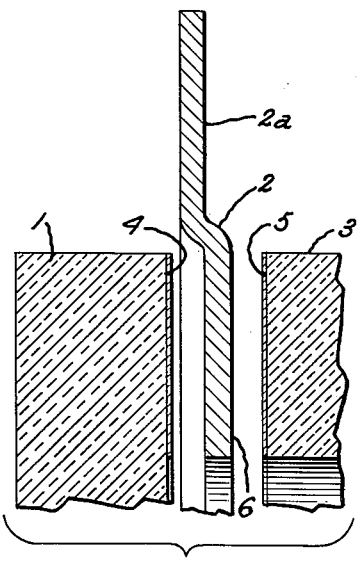
FIG. 2 is an enlarged view of a portion of the composite body of FIG. 1 showing the parts prior to assembly.
Figure 4:
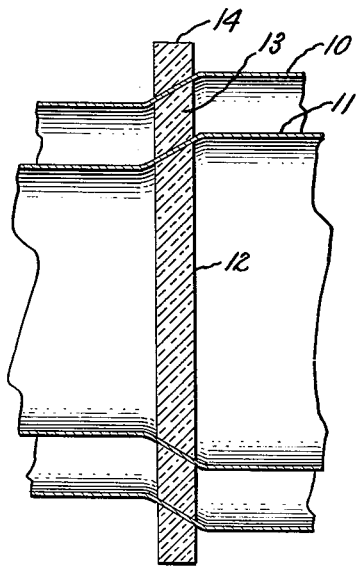
FIG. 4 is an elevational view in section showing a second composite body.
Figure 5:
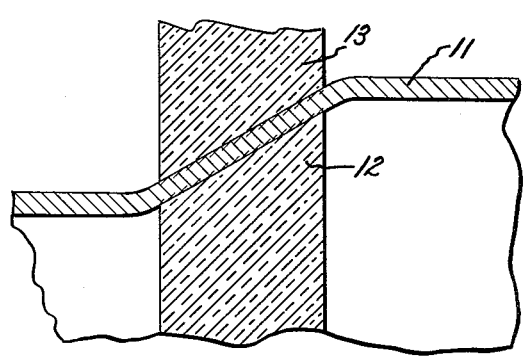
FIG. 5 is an elevational view in section of a portion of the body shown in FIG. 4.

In FIGS. 4 and 5, there is illustrated another structural embodiment of my invention in which a transmission line of the concentric type and including concentric conductors 10 and 11 is sealed off by means of a disk 12 of quartz and an annular quartz member bonded between the inner and outer conductors. A third quartz member 14 surrounds the outer conductor, with all of the quartz members lying in a common transverse plane, so that both sides of the conductors 10 and 11 are subjected to essentially the same stresses. For members 12, 13 and 14 of quartz and members 10 and 11 of silver and indium solder, the process is carried out exactly as described in connection with FIGS. 1-3 inclusive. It will be understood that other combinations of materials may be used in accordance with the foregoing detailed description.

It will be noted that in those structural modifications described in the foregoing specification, equal areas on opposite sides of the structural members are bonded to the insulating member. This arrangement, which may be termed a symmetrical arrangement with respect to the opposite faces of the metallic member, tends to equalize the stresses so that the metal member will not buckle and will not be torn from the nonmetallic member.

While much emphasis has been made in the foregoing specification on the advantage of the present invention as applied to the bonding with quartz or fused silica bodies, it applies equally well to other nonmetallic refractory bodies. The advantages in connection with quartz are marked from a commercial point of view, since other methods which work rather well with ceramic bodies (alumina and steatite bodies) have not been applied with the same success to the bonding of quartz.

While both titanium and zirconium, such as provided by the dissociation of the hydride, have been referred to as "the active metal," it should be noted that titanium is much preferred for most applications of the present invention. Titanium is more active than zirconium and its hydride dissociates at a lower temperature.

It should be emphasized that it is important in accordance with the present invention to keep the amount of the active metal, namely titanium or zirconium, at a minimum in order to preserve the ductility of the junction with the nonmetallic body and prevent the formation of a low-strength interface. It is also necessary to limit the amount of ductile solder present so that during the second heating step it is possible to form only an alpha-phase alloy with the structural member and leave no uncombined solder in the joint. In this way, the resultant bond is capable of withstanding temperatures up to the melting point of the alpha-phase alloy formed, which may be several times that of the metallic ductile solder alone. The presence of this alloy with only the ductile solder that is combined with the active metal provides a bond capable of withstanding high temperatures. At the same time the process of this invention prevents the formation of a brittle interface such as would be formed, for example, if a high temperature bond were attempted by reacting silver or even a silver-indium alloy directly with quartz.

What I claim as new and desire to secure by Letters Patent of the United States is:

1. The method of forming a hermetic bond capable of withstanding high temperatures between a quartz member and a metal member which comprises applying a thin layer of a powdered metal hydride and a low-melting-point ductile solder to the surface of the quartz member to be bonded, the metal of the hydride being selected from the group consisting of zirconium, titanium and mixtures thereof, the low melting point ductile solder being selected from the group consisting of indium, thallium, tin, cadmium, zinc and gallium and the metal member being selected from the group consisting of silver, gold and copper, the combinations of thallium with gold and copper and cadmium with copper being excluded, heating the coated member in a nonreactive atmosphere to dissociate the hydride and alloy the liberated metal of the hydride and the solder and bond the coating to the quartz member, placing the quartz member with the coated area in juxtaposition to the metal member, heating the members to alloy the structural member with low-melting-point ductile solder, limiting the thickness of the ductible solder sufficiently to provide only a small amount of free ductile solder relative to the structural member available for alloying therewith to insure the formation during the second heating step of only an alpha-phase alloy to provide a bond capable of withstanding temperatures substantially higher than the melting point of the ductile solder.

2. The method of bonding a quartz member to a structural member of silver which comprises applying a thin layer of a powdered metal hydride selected from the group consisting of titanium hydride and zirconium hydride and mixtures thereof to the area of the quartz member to be bonded, applying a thin layer of powdered indium over the coated area and heating the coated member in vacuum to dissociate the hydride and form a tightly adhereing alloy layer on the quartz member with a slight excess of metallic indium, placing the coated area of the quartz member in contact with the structural member of silver and heating again in a vacuum to a temperature above the minimum temperature at which an alpha phase alloy only is formed between the indium and silver and below the melting point of pure silver, the amount of indium available for alloying with the silver being limited to produce only an alpha-phase alloy to provide a bond characterized by the absence of metallic indium and capable of withstanding a temperature several times higher than the melting point of metallic indium.

3. The method of forming a hermetic bond capable of withstanding high temperatures between a quartz member and a metal member which comprises applying a thin layer of titanium hydride and indium to the surface of the quartz member to be bonded, heating the coated quartz member in vacuum to a temperature in the order of 550° C. to dissociate the hydride and alloy the titanium with the indium and react the titanium and indium with the quartz, placing the coated area of quartz in juxtaposition to a silver member, heating the members in vacuum to alloy the structural member with the indium, limiting the thickness of the indium sufficiently to provide only a small amount of free indium relative to the amount of silver of the structural member available for alloying therewith to insure the production during the heating step of only an alpha-phase alloy to provide a bond capable of withstanding temperatures substantially higher than the melting point of indium.

4. The method of forming a hermetic bond capable of withstanding high temperatures between a nonmetallic refractory member and a metal structural member which comprises applying to a selected area of said nonmetallic refractory member a thin coating of a powdered metal hydride and a ductile solder, the metal of the hydride being selected from the group consisting of titanium and zirconium or mixtures thereof, the ductile solder being selected from the group consisting of indium, gallium, thallium, tin, zinc and cadmium, the metal of the structural member being selected from the group consisting of silver, gold and copper the combinations of thallium with gold and copper and cadmium with copper being excluded, heating the coated nonmetallic refractory body to a temperature of at least 550° C. in a nonreactive atmosphere to dissociate the hydride and alloy the metal thereof with the solder and form a tightly adhering metallic layer on the nonmetallic refractory member, placing the coated area of refractory member in juxtaposition to said structural member, and heating the assembly in a nonreactive atmosphere to produce an alpha-phase alloy of the low-melting-point ductile solder and the structural member at the junction of the coated nonmetallic refractory member and the structural member, limiting the thickness of the ductile solder sufficiently to provide only a small amount of free ductile solder relative to the structural member available for alloying therewith to insure the formation during the second heating step of only an alpha phase alloy of the ductile solder and structural member so that the resulting joint is characterized by an alpha-phase alloy and that uncombined ductile solder is not present, thereby to provide a bond between the nonmetallic refractory body and the structural metal member capable of withstanding an operating temperature substantially greater than the melting point of the ductile solder.

5. The method of forming a hermetic bond capable of withstanding high temperatures between a quartz member and a metal member which comprises applying a thin layer of titanium hydride and tin to the surface of the quartz member to be bonded, heating the coated quartz member in vacuum to a temperature in the order of 550° C. to dissociate the hydride and alloy the titanium with the tin and react the titanium and tin with the quartz, placing the coated area of quartz in juxtaposition to a silver member, heating the members in vacuum to alloy the structural member with the tin, limiting the thickness of the tin sufficiently to provide only a small amount of free tin relative to the amount of the structural member available for alloying therewith to insure the formation during the second heating step of only an alpha-phase alloy with the silver to provide a bond capable of withstanding temperatures substantially higher than the melting point of tin.

6. The method of forming a hermetic bond capable of withstanding high temperatures between a non-metallic refractory member and a metal member which comprises applying a thin layer of an active metal and a low melting point ductile solder to a selected area of the non-metallic refractory member to be bonded, the active metal being selected from the group consisting of zirconium, titanium, and mixtures thereof, the ductile solder being selected from the group consisting of indium, thallium, tin, cadmium, zinc, and gallium, and the metal of the metal member being selected from the group consisting of silver, gold and copper, the combinations of thallium with gold and copper and cadmium with copper being excluded, heating the coated non-metallic refractory member in a non-reactive atmosphere to alloy the active metal and the solder and bond it to the non-metallic refractory member, placing the non-metallic refractory member with the coated area in juxtaposition to the metal member, heating the members in a non-reactive atmosphere to alloy the structural member with the low melting point ductile solder, limiting the thickness of the ductile solder sufficiently to provide only a small amount of ductile solder relative to the amount of structural member available for alloying therewith to insure the formation during the second heating step of only an alpha phase alloy to provide a bond capable of withstanding temperatures substantially higher than the melting point of the ductile solder.

References Cited in the file of this patent

UNITED STATES PATENTS

| | | |
|---|---|---|
| 2,163,409 | Pulfrich | June 20, 1939 |
| 2,322,507 | Cole | June 22, 1943 |
| 2,496,346 | Haayman et al. | Feb. 7, 1950 |
| 2,512,455 | Alexander | June 20, 1950 |
| 2,570,248 | Kelley | Oct. 9, 1951 |
| 2,650,683 | McPhee et al. | Sept. 1, 1953 |
| 2,686,958 | Eber et al. | Aug. 24, 1954 |
| 2,724,892 | Knochel et al. | Nov. 29, 1955 |
| 2,746,140 | Belser | May 22, 1956 |
| 2,776,472 | Mesick | Jan. 8, 1957 |
| 2,859,512 | Dyksterhuis et al. | Nov. 11, 1958 |
| 2,917,140 | Omley | Dec. 15, 1959 |

FOREIGN PATENTS

| | | |
|---|---|---|
| 591,343 | Great Britain | Aug. 14, 1947 |

OTHER REFERENCES

The Review of Scientific Instruments, volume 25, No. 2, February 1954, pp. 180–183, article by Belser.